US011853198B2

(12) United States Patent
Wakabayashi et al.

(10) Patent No.: US 11,853,198 B2
(45) Date of Patent: Dec. 26, 2023

(54) PROGRAM DEVELOPMENT ASSISTANCE SYSTEM AND PROGRAM DEVELOPMENT ASSISTANCE METHOD

(71) Applicant: Hitachi, Ltd., Tokyo (JP)

(72) Inventors: Noboru Wakabayashi, Tokyo (JP); Masumi Kawakami, Tokyo (JP); Kosuke Oshima, Tokyo (JP); Akihiro Hori, Tokyo (JP); Ryosuke Yasuoka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 22 days.

(21) Appl. No.: 17/640,491

(22) PCT Filed: Nov. 19, 2020

(86) PCT No.: PCT/JP2020/043165
§ 371 (c)(1),
(2) Date: Mar. 4, 2022

(87) PCT Pub. No.: WO2021/131435
PCT Pub. Date: Jul. 1, 2021

(65) Prior Publication Data
US 2022/0327047 A1 Oct. 13, 2022

(30) Foreign Application Priority Data

Dec. 26, 2019 (JP) .................................. 2019-237180

(51) Int. Cl.
*G06F 9/44* (2018.01)
*G06F 11/36* (2006.01)
(Continued)

(52) U.S. Cl.
CPC ............ *G06F 11/3688* (2013.01); *G06F 8/20* (2013.01); *G06F 8/71* (2013.01); *G06F 11/368* (2013.01)

(58) Field of Classification Search
None
See application file for complete search history.

(56) References Cited

U.S. PATENT DOCUMENTS 10,430,319 B1 * 10/2019 Tokappa ............. G06F 11/3692
10,725,816 B2 * 7/2020 Jarvis .................. G06F 11/3672
(Continued)

FOREIGN PATENT DOCUMENTS

JP 2010-134643 A 6/2010

OTHER PUBLICATIONS

John Ferguson, Jenkins: The Definitive Guide: Continuous Integration for the Masses, by Smart, Jon Ferguson, published by O'Reilly Japan, Feb. 22, 2012.
(Continued)

*Primary Examiner* — Wei Y Zhen
*Assistant Examiner* — Lanny N Ung
(74) *Attorney, Agent, or Firm* — MATTINGLY & MALUR, PC

(57) ABSTRACT

A program development assistance system includes an automatic execution process server that accepts a commit completion notification indicating that a source code has been registered, commit information that includes source code information and ticket information is acquired, a ticket identifier is extracted from the commit information, attribute information pertaining to a ticket is acquired on the basis of the extracted ticket identifier, information to be executed that corresponds to the source code to be processed by automatic execution is stored in an automatic execution queue, the sequence of to-be-executed information in the automatic execution queue is altered on the basis of the acquired attribute information pertaining to the ticket, the source code and a test case that are to be processed by automatic execution are acquired, and an automatic execu-
(Continued)

tion process is performed using the source code and the test case on the basis of the sequence of to-be-executed information.

8 Claims, 8 Drawing Sheets

(51) Int. Cl.
    *G06F 8/20*         (2018.01)
    *G06F 8/71*         (2018.01)

(56) References Cited

U.S. PATENT DOCUMENTS

| | | | |
|---|---|---|---|
| 2016/0048444 A1* | 2/2016 | Crova | G06F 11/3676 717/124 |
| 2018/0307583 A1* | 10/2018 | Yang | G06F 11/368 |
| 2019/0065357 A1* | 2/2019 | Brafman | G06F 11/3664 |
| 2021/0089297 A1* | 3/2021 | Duvall | G06F 8/30 |

OTHER PUBLICATIONS

Andriy Lesyuki, "Mastering Redmine," Packt publishing, Jan. 25, 2013.
International Search Report of PCT/JP2020/043165 dated Jan. 26, 2021.

\* cited by examiner

| | 201 |
|---|---|
| TYPE | DEFECT |

| | 202 |
|---|---|
| TITLE | COLOR DOES NOT CHANGE EVEN WHEN BUTTON IS PRESSED. |

| | 203 |
|---|---|
| CONTENT DESCRIPTION | COLOR IS SUPPOSED TO CHANGE FROM "BLUE" TO "RED" WHEN BUTTON A IS PRESSED, BUT WHEN BUTTON A IS PRESSED AFTER BUTTON B HAS BEEN PRESSED, COLOR DOES NOT CHANGE TO RED AND STAYS BLUE. |

| | 204 |
|---|---|
| PERSON IN CHARGE | |
| PERSON A | |

| | 208 |
|---|---|
| PARENT TICKET | |
| 1234 | |

| | 205 |
|---|---|
| STATUS | WORK IN PROGRESS |

| | 209 |
|---|---|
| RELATED TICKETS | |
| - 1231<br>- 1232<br>- 1233 | |

| | 206 |
|---|---|
| PRIORITY | NORMAL |

| | 207 |
|---|---|
| DUE DATE | AUGUST 31, 2019 |

| | 210 |
|---|---|
| CRITICAL PATH FLAG | TRUE |

| HISTORY | 211 |
|---|---|

PERSON A : (8/1)
  I WILL LOOK INTO DEFECT.
PERSON A : (8/2)
  I HAVE REPRODUCED DEFECT.
PERSON A : (8/3)
  I AM NOW CORRECTING SOURCE CODE A.

*FIG.2*

PROGRAM DEVELOPMENT ASSISTANCE SYSTEM AND PROGRAM DEVELOPMENT ASSISTANCE METHOD

CLAIM OF PRIORITY

The present application claims priority from Japanese patent application JP 2019-237180 filed on Dec. 26, 2019, the content of which is hereby incorporated by reference into this application.

BACKGROUND

This invention relates to a program development assistance system and a program development assistance method.

As a method of developing programs, a method called continuous integration, which is best practice in agile development, is known. In program development using continuous integration, when a created source code is registered in (committed to) a version management system which manages the source code, work, such as building and testing the source code, is automatically executed. As a result, by enabling a defect to be detected at an early stage, it is possible to achieve more efficient and higher quality development. As a tool for implementing such continuous integration, for example, Jenkins (Smart, John Ferguson (written), Ryuji Tamagawa (translated), "Jenkins," O'Reilly Japan, Inc., Feb. 22, 2012) is known.

In program development, as ticket driven development, there is known a development method in which work is managed by dividing the work into tasks and assigning the tasks to tickets (forms) in a bug tracking system (BTS). For example, Redmine (Andriy Lesyuk, "Mastering Redmine," Packt publishing, Jan. 25, 2013) is known as a tool for managing such tickets. The method as described in Andriy Lesyuk, "Mastering Redmine," Packt publishing, Jan. 25, 2013 is highly compatible with agile development, and hence is often implemented in combination with the above-mentioned continuous integration.

As a background technology of the technical field relating to the above-mentioned technology, there is known JP 2010-134643 A. In JP 2010-134643 A, there are described a method and system for selecting a test case, in which the test case is selected so that the test can be efficiently performed in continuous integration, and there is described means for selecting the test case to be executed based on execution importance and an execution time threshold value passed from a continuous integration tool, and the importance and execution record time of the test cases stored in a repository.

SUMMARY

The continuous integration tools as described in Smart, John Ferguson (written), Ryuji Tamagawa (translated), "Jenkins," O'Reilly Japan, Inc., Feb. 22, 2012, for example, and the ticket management tools as described in Andriy Lesyuk, "Mastering Redmine," Packt publishing, Jan. 25, 2013, for example, may be implemented in combination, and there are methods of linking those tools.

However, there is only simple linkage, that is, it is possible to transition from a ticket display screen of the ticket management tool to a screen of a result of the automatic execution by the continuous integration tool, and therefore, in order to perform automatic execution in accordance with the content described in the ticket, it is required to perform a manual setting in advance.

For example, when the number of commits increases, the automatic execution processing queues up, and therefore it is required to manually set in advance such a setting that processing relating to higher priority tickets is not deferred. Further, depending on the content of the work, higher efficiency can be achieved by changing the range or frequency of automatic execution, but it is required to prepare a plurality of range and frequency settings that take into account all situations.

In JP 2010-134643 A, there is described means for selecting a test case to be executed based on execution importance and an execution time threshold value passed from a continuous integration tool, and the importance and execution record time of the test cases stored in a repository.

As a result, the test case can be selected so that a test in continuous integration can be performed efficiently. However, a determination is performed based on the importance of the test case, and hence non-test builds, static analysis (coding check), reviews, and the like are not considered.

Further, in JP 2010-134643 A, the attribute to be determined is only the importance of the test case, and therefore it is not possible to prioritize among cases having the same importance. Moreover, there is no consideration given to attributes, such as a due date, a person in charge, or status, which are ticket attributes. Therefore, it is required to prepare a plurality of settings that take into account all situations depending on the attribute information on the ticket in order to prioritize among processes other than tests and prioritize among cases having the same importance.

In view of the above, this invention provides a program development assistance system and a program development assistance method which are capable of efficiently performing automatic execution processing by automatically changing content of automatic execution processing based on attributes of a ticket.

According to one aspect of the present invention a program development assistance system, comprising an automatic execution processing server including a processor, a memory, and a communication interface. The automatic execution processing server includes a commit information acquisition module configured to acquire, when a commit completion notification indicating that a source code has been registered is received, commit information including information on the source code and information on a ticket corresponding to the source code, a link module configured to extract a ticket identifier corresponding to the commit completion notification from the commit information, an attribute information acquisition module configured to acquire attribute information on the ticket based on the extracted ticket identifier, an automatic execution queue configured to store, in a predetermined order, execution target information corresponding to the source code on which automatic execution processing is to be performed, an automatic execution processing change module configured to generate information specifying a source code from the acquired commit information as execution target information, input the generated information to the automatic execution queue, and to change the predetermined order of the execution target information in the automatic execution queue based on the acquired attribute information on the ticket, a target deliverable acquisition module configured to acquire a source code and a test case on which the automatic execution processing is to be performed, an automatic execution processing module configured to perform automatic execution processing by using the source code and the test case acquired by the target deliverable acquisition module based on the predetermined order of the execution target information changed by the automatic execution processing change module and a notification module configured to notify a result of the automatic execution processing executed by the automatic execution processing module.

According to the at least one embodiment of this invention, the automatic execution processing can be automatically changed based on the attribute information on the ticket, and the automatic execution processing in the continuous integration can be performed efficiently.

The details of at least one embodiment of a subject matter disclosed herein are set forth in the accompanying drawings and the following description. Other features, aspects, and effects of the disclosed subject matter become apparent from the following disclosure, drawings, and claims.

BRIEF DESCRIPTION OF THE DRAWINGS

FIG. 2 is a diagram for illustrating content described in a ticket in the first embodiment of this invention.

DETAILED DESCRIPTION OF THE PREFERRED EMBODIMENTS

Embodiments of this invention are described below with reference to the accompanying drawings.

First Embodiment

A first embodiment of this invention is one embodiment of a program development assistance system and a program development assistance method according to this invention. The first embodiment is now described with reference to FIG. 1A to FIG. 6.

Figure 1A:
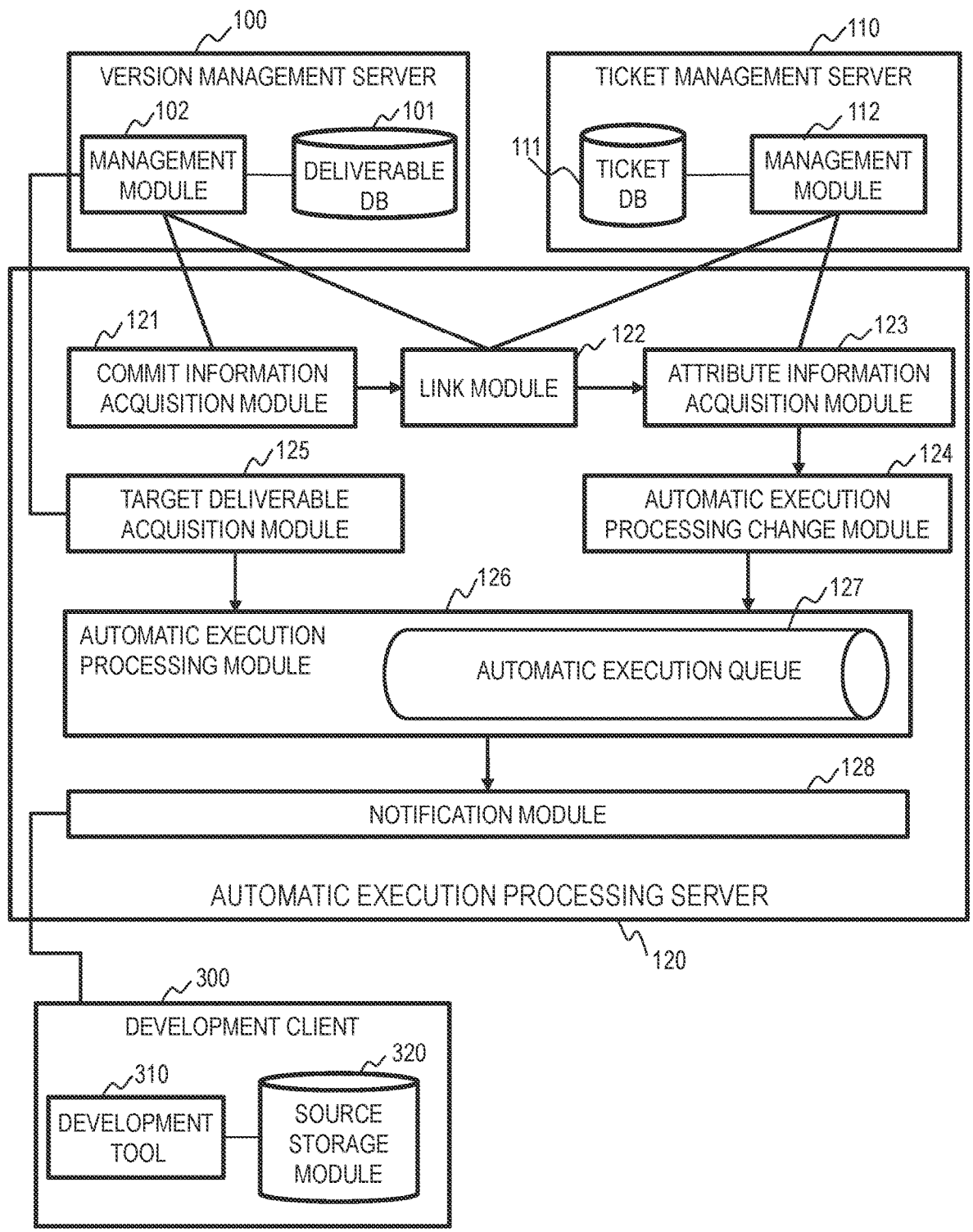
FIG. 1A is a block diagram for illustrating a configuration of the program development assistance system of the first embodiment of this invention.
Figure 1B:
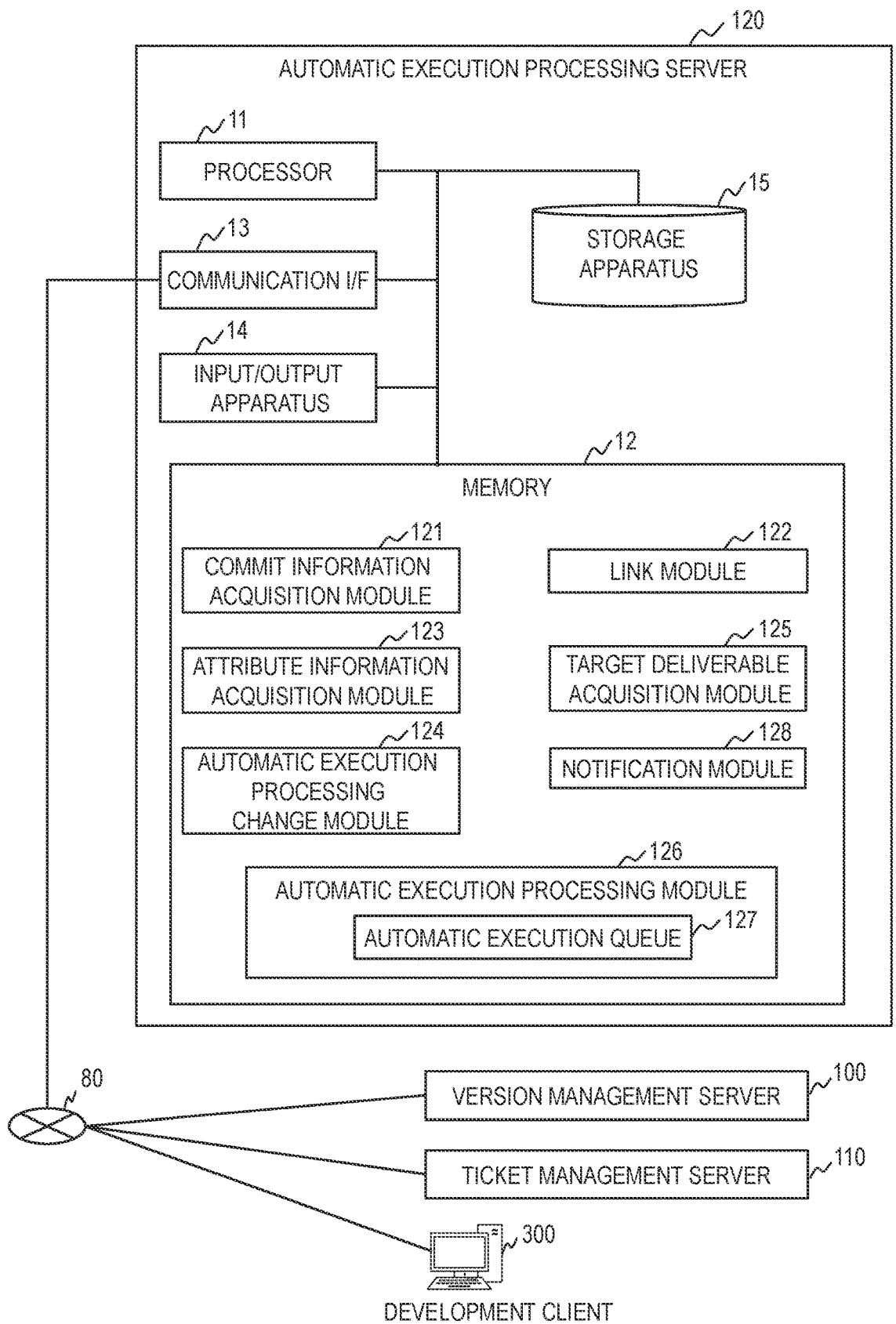
FIG. 1B is a block diagram for illustrating an example of a configuration of an automatic execution processing server the first embodiment of this invention.
Figure 3:
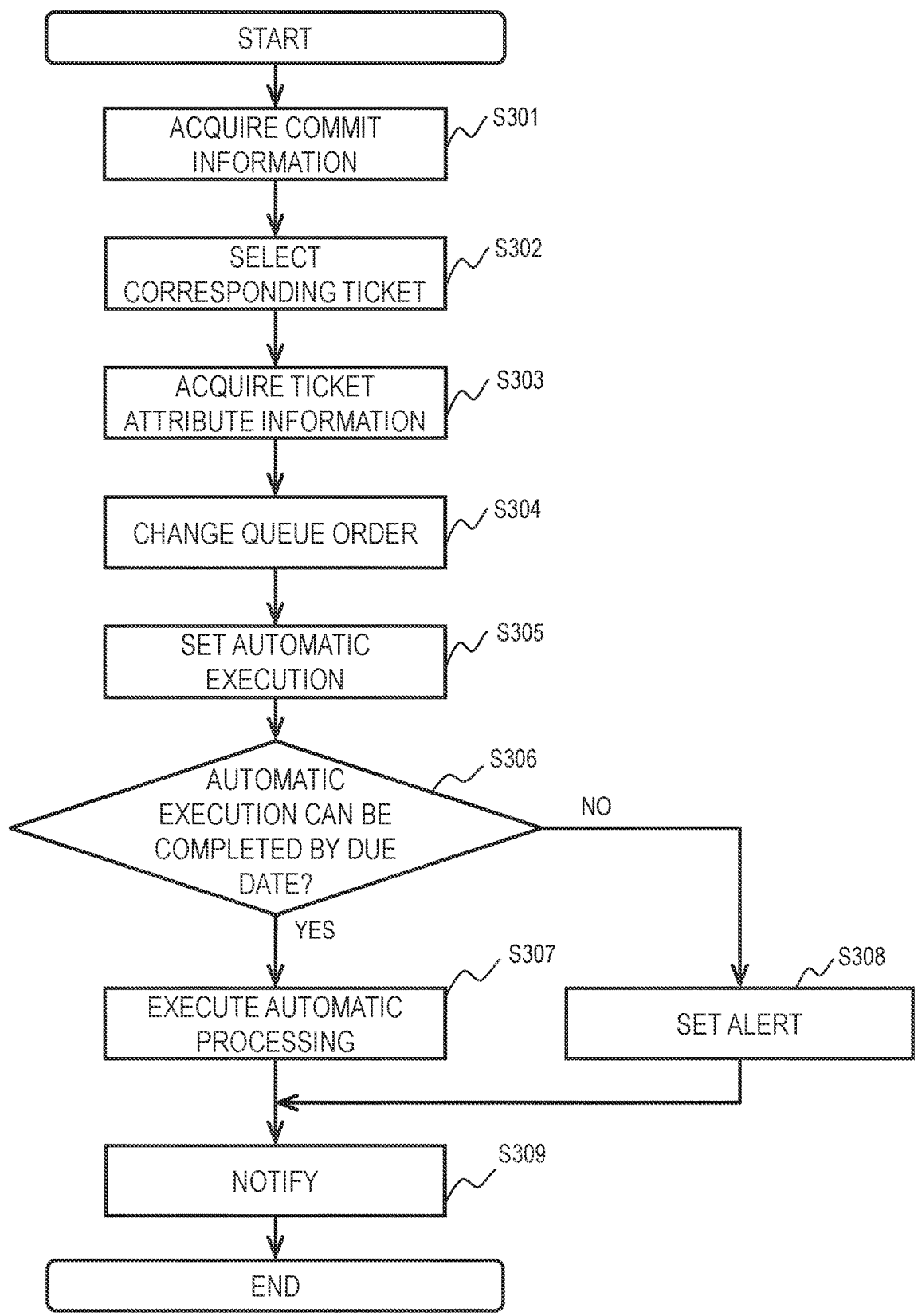
FIG. 3 is a flowchart for illustrating an outline of a processing procedure in the automatic execution processing system in the first embodiment of this invention.
Figure 4:
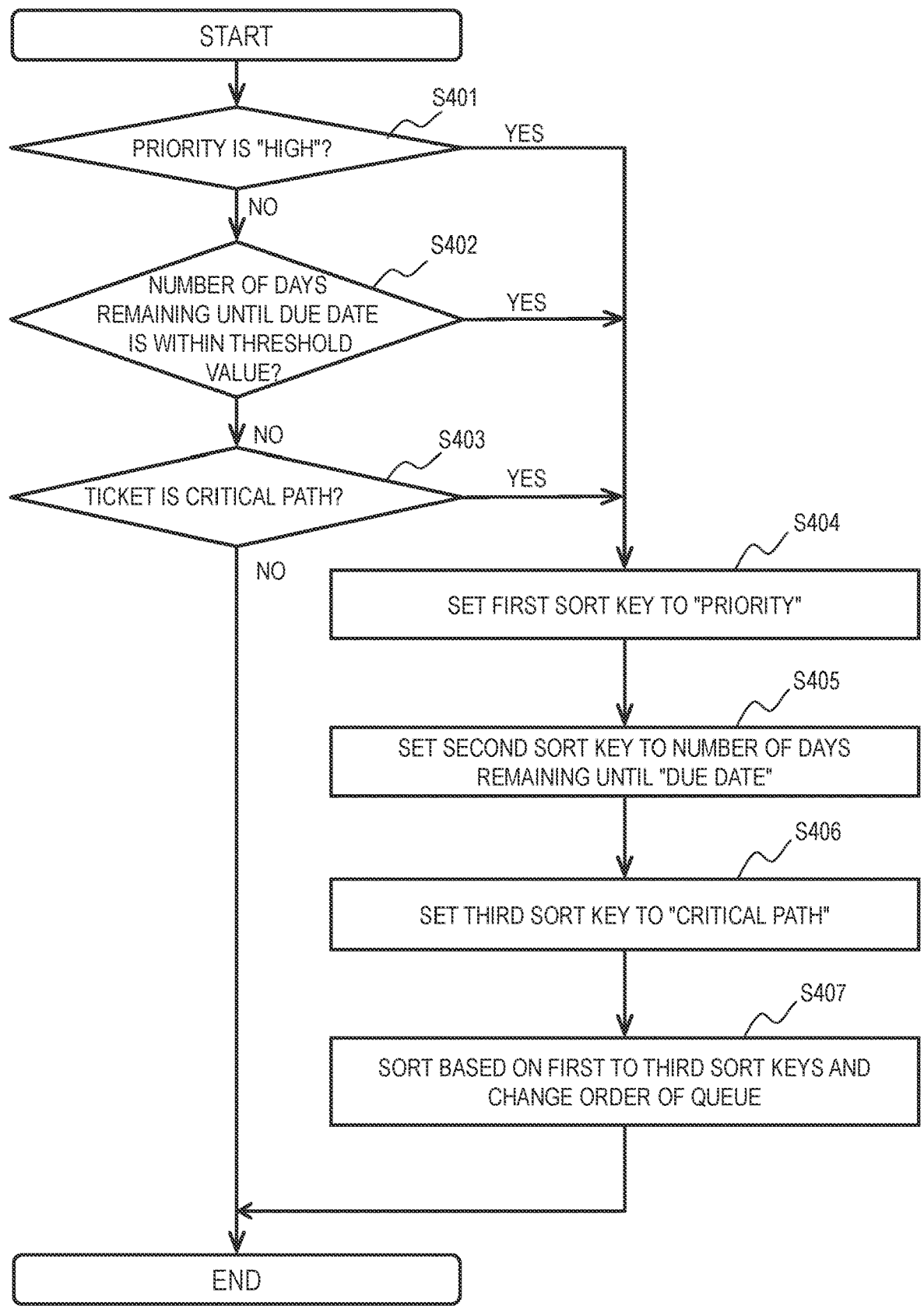
FIG. 4 is a flowchart for illustrating a detailed procedure of queue order change processing in the first embodiment of this invention.
Figure 5:
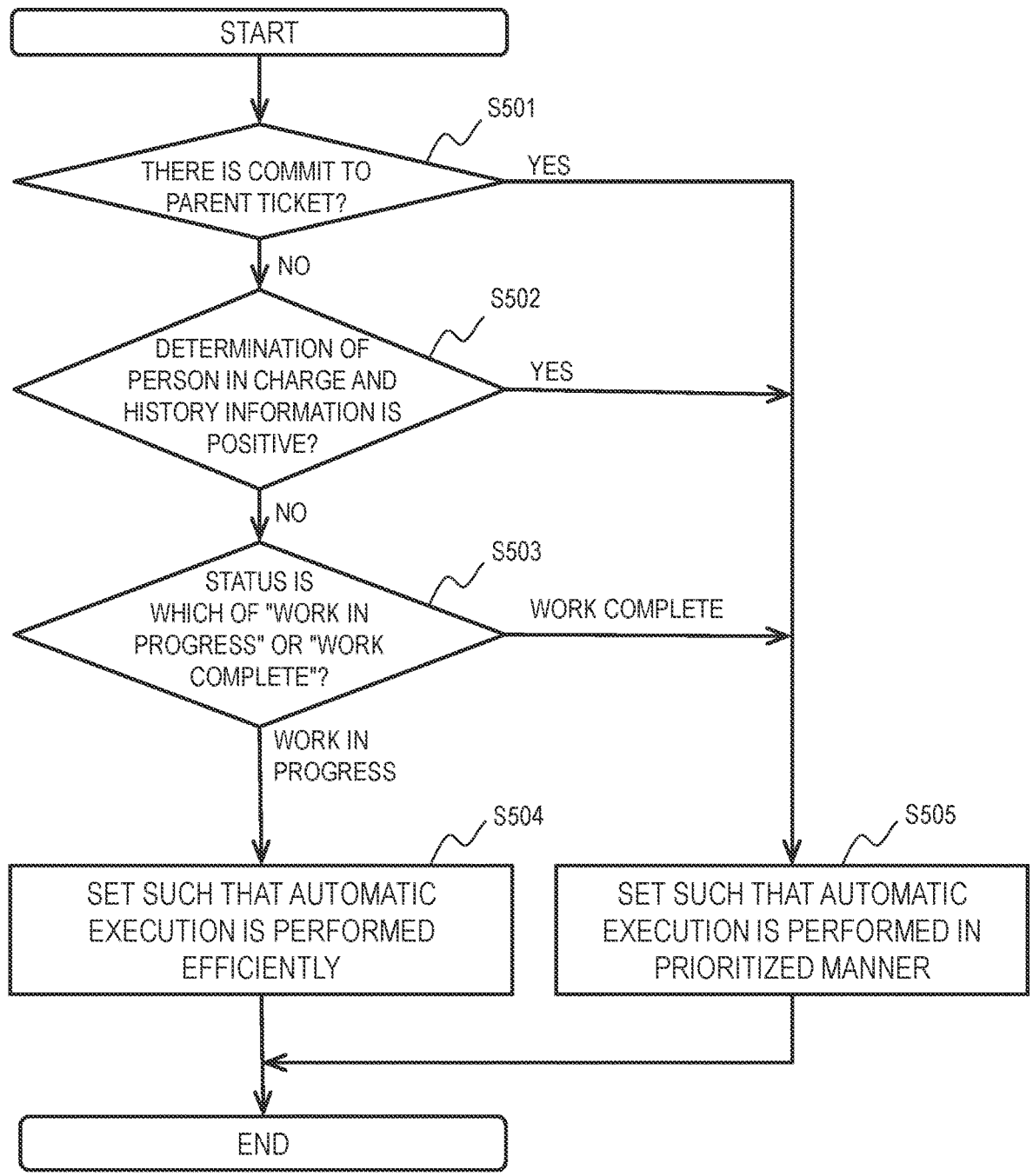
FIG. 5 is a flowchart for illustrating a detailed procedure of automatic execution setting in the first embodiment of this invention.
Figure 6:
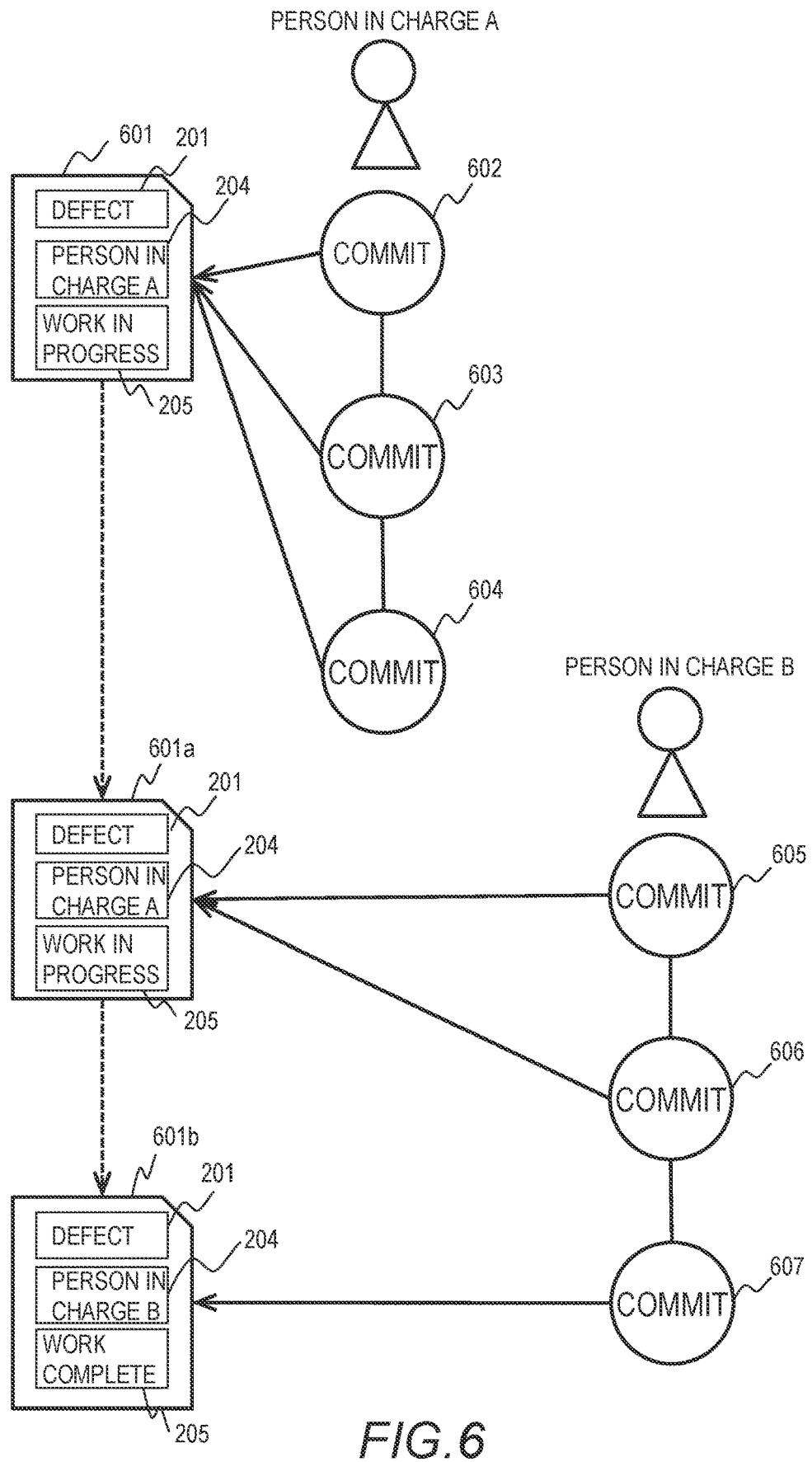
FIG. 6 is an example of a diagram for illustrating a use case in which a plurality of persons in charge correct a source code for a one ticket in the first embodiment of this invention.

FIG. 1A is a block diagram for illustrating a configuration of the program development assistance system of the first embodiment. FIG. 1B is a block diagram for illustrating an example of a configuration of an automatic execution processing server. FIG. 2 is a diagram for illustrating content described in a ticket in the first embodiment. FIG. 3 is a flowchart for illustrating an outline of a processing procedure in the automatic execution processing system in the first embodiment. FIG. 4 is a flowchart for illustrating a detailed procedure of queue order change processing in the first embodiment. FIG. 5 is a flowchart for illustrating a detailed procedure of automatic execution setting in the first embodiment. FIG. 6 is an example of a diagram for illustrating a use case in which a plurality of persons in charge correct a source code for a one ticket in the first embodiment.

In FIG. 1A, a version management server 100 manages a source code or a test case (for example, execution environment) corresponding to the source code on a version-by-version basis, a ticket management server 110 manages work relating to program creation and content relating to a defect as tickets (forms), an automatic execution processing server 120 automatically executes the work relating to program creation, such as building and testing of the source code, when the source code is registered in (committed to) the version management server 100, and a development client 300 generates the source code.

The program development assistance system of the first embodiment is built from the version management server 100, the ticket management server 110, the automatic execution processing server 120, and the development client 300.

A deliverable database 101 stores the source code and the test cases managed by the version management server 100. A management module 102 manages registration and retrieval of the source code and test cases of the deliverable database 101, for example. The version management server 100 in the first embodiment is built from the deliverable database 101 and the management module 102.

A ticket database 111 stores the tickets managed by the ticket management server 110. A management module 112 manages registration and retrieval of the tickets in the ticket database 111, for example. The ticket management server 110 in the first embodiment is built from the ticket database 111 and the management module 112. The version management server 100 and the ticket management server 110 may use existing commercially available or open source software (OSS) tools.

A commit information acquisition module 121 acquires committed information from the version management server 100. A link module 122 extracts, from the commit information acquired by the commit information acquisition module 121, the ID (or number) of the ticket corresponding to the commit and links the version management server 100 and the ticket management server 110. An attribute information acquisition module 123 acquires ticket attribute information on the ticket having the extracted ticket ID from the ticket management server 110.

An automatic execution processing change module 124 changes, based on the acquired attribute information on the ticket, the order of the execution target information stored in an automatic execution queue 127. A target deliverable acquisition module 125 acquires the source code and test case to be automatically executed from the version management server 100.

In the first embodiment, the automatic execution queue 127 stores one or more pieces of execution target information, and each piece of execution target information corresponds to one instance of performing automatic execution processing. The execution target information includes information specifying the source code or test case on which automatic execution processing is to be performed. The automatic execution processing change module 124 controls the execution order of the execution target information stored in the automatic execution queue 127. The execution target information is not limited to information specifying the source code or test case, and may be the actual source code or test case.

An automatic execution processing module 126 performs automatic execution processing by using the target source code and test case acquired by the target deliverable acquisition module 125 based on the processing order of the execution target information determined by the automatic execution processing change module 124. The automatic execution processing module 126 performs, like in the example of the related art described above, testing based on the build of the source code or test case, static analysis, and review. The automatic execution queue 127 manages one or more pieces of execution target information in a queue in a predetermined order. A notification module 128 notifies related parties of results executed by the automatic execution processing module by e-mail, for example.

The automatic execution processing server 120 in the first embodiment is built from the commit information acquisition module 121, the link module 122, the attribute information acquisition module 123, the automatic execution processing change module 124, the target deliverable acquisition module 125, the automatic execution processing module 126, the automatic execution queue 127, and the notification module 128.

A development tool 310 generates, for example, a source code from information received from an input device (not shown) operated by the person in charge of development. A source storage module 320 stores the generated source code and information (for example, test case) associated with the source code.

The development client 300 in the first embodiment is built from the development tool 310 and the source storage module 320.

FIG. 1B is a block diagram for illustrating an example of the configuration of the automatic execution processing server 120. The automatic execution processing server 120 is a computer including a processor 11, a memory 12, a communication interface 13, an input/output apparatus 14, and a storage apparatus 15.

The input/output apparatus 14 includes an input apparatus, such as a mouse, a keyboard, or a touch panel, and an output apparatus such as a display. The communication interface 13 communicates to and from the version management server 100, the ticket management server 110, and the development client 300 via a network 80.

In the memory 12, the commit information acquisition module 121, the link module 122, the attribute information acquisition module 123, the automatic execution processing change module 124, the target deliverable acquisition module 125, the automatic execution processing module 126, and the notification module 128 are loaded and executed by the processor 11. Further, the automatic execution queue 127 managed by the automatic execution processing module 126 is set in the memory 12.

The processor 11 operates as the function modules which provide predetermined functions by executing processing in accordance with the program of each function module. For example, the processor 11 functions as the automatic execution processing module 126 by executing processing in accordance with an automatic execution processing program. The same applies to the other programs. Further, the processor 11 also operates as function modules which provide the function of each of a plurality of instances of processing executed by each program. The computer and the computer system are an apparatus and a system including those function modules.

FIG. 2 is a screen display example of a ticket managed by the ticket management server 110, in which attributes of the ticket are illustrated.

In FIG. 2, a type attribute 201 indicates the type of the ticket, such as "work" or "defect." A title attribute 202 indicates a title of the ticket. A content description attribute 203 indicates "work details" or "defect details" of the ticket.

A person-in-charge attribute 204 indicates the person in charge of the ticket. A status attribute 205 indicates a situation or a state of the ticket, such as "new," "work in progress," or "work complete." A priority attribute 206 indicates the priority of the processing to be handled by a ticket, such as work or a defect response.

A due date attribute 207 indicates a due date for the work or the defect response. A parent ticket attribute 208 indicates information on a parent ticket, which is a ticket one step higher up in the hierarchy than the ticket. A ticket attribute 209 indicates that there is a ticket which is related in terms of work order, for example, work cannot start unless the status attribute of another ticket is "finish," or is related in terms of having overlapping content.

A critical path attribute 210 indicates whether, in terms of step management, the ticket is a ticket of a series of work (critical path) for which there is not a shorter work time even if the work is performed in parallel among the series of work until all of the steps are finished. A change history attribute 211 indicates a change history of a situation report of the work content indicated in the ticket and the attribute of the ticket.

In FIG. 2, the attributes are clearly shown on the ticket screen, but the attributes are not required to be clearly shown on the ticket screen. For example, the critical path attribute 210 may be displayed as attribute data of the ticket.

There is now described a processing outline of the first embodiment with reference to FIG. 1 and the flowchart of FIG. 3. First, the person in charge using the development client 300 creates a program (creates or corrects a source code) for a ticket issued by the ticket management server 110 in accordance with the content of the issued ticket.

Then, the person in charge registers (commits) the source code by using the version management server 100. At that time, the ticket number (ID) of the ticket corresponding to a commit log, for example, is input, and it is clearly shown which ticket the source code is for. When the commit of the source code is complete, the version management server 100 transmits a notification (commit completion notification) indicating that the commit is complete to the automatic execution processing server 120.

When the automatic execution processing server 120 receives the commit completion notification, the commit information acquisition module 121 acquires information on the commit (commit information) from the version management server 100 (Step S301). In the first embodiment, the information on the commit is the information at the time of the commit, including the file name (or an identifier) of the committed source code, the commit log (chart identifier), and the test case.

The link module 122 acquires information on the ticket such as the corresponding ticket number (or ticket ID), which is included in the commit information acquired by the commit information acquisition module 121, and causes the ticket management server 110 to select the ticket corresponding to the commit (Step S302).

Then, the attribute information acquisition module 123 acquires information on the ticket attributes of the corresponding ticket from the ticket management server 110 (Step S303). In the first embodiment, the ticket attributes are the ticket attributes (201 to 210) illustrated in FIG. 2.

The automatic execution processing change module 124 changes the queue order of the automatic execution queue 127 based on the acquired ticket attribute information (Step S304).

First, the automatic execution processing change module 124 generates information specifying the source code or the test case from the acquired commit information as execution target information, and inputs the generated information to the automatic execution queue 127. Then, the automatic execution processing change module 124 changes or sets the order of the execution target information based on the acquired ticket attribute information (Step S305).

The automatic execution processing module 126 uses the due date attribute 207 of the ticket attribute information acquired in Step S303 described above to determine whether or not automatic execution of the execution target information can be completed by the due date based on the actual times of past automatic execution processing (Step S306). When automatic execution can be completed by the due date, the automatic execution processing module 126 executes the automatic processing of the execution target information in the automatic execution queue 127 in accordance with the order set in Step S305 described above (Step S307).

The automatic execution processing module 126 stores, for each combination (execution target information) of the source code and test case, the actual result of the execution time in the storage apparatus 15, and determines whether or not automatic execution of the execution target information can be completed by the due date specified by the due date attribute 207 based on the actual results of past execution times. Further, as the actual results of the past execution times, statistical information set in advance, such as a maximum value or an average value of the execution time, can be used.

Meanwhile, for execution target information determined by the automatic execution processing module 126 not to be completable by the due date, alert information including a message that the execution target information is not completable by the due date is set (Step S308), and automatic processing is not executed. Then, the notification module 128 notifies the result executed in Step S307 or the alert set in Step S308 to a destination (for example, development client 300) set in advance by using notification means, such as e-mail or a message (Step S309), and ends the series of processing steps.

Next, the detailed procedure of the queue order change processing (Step S304) in the flowchart illustrated in FIG. 3 is described with reference to the flowchart of FIG. 4. The queue order change processing is executed in the automatic execution processing change module 124. The processing is performed on the information of the ticket corresponding to the source code corresponding to the commit completion notification.

The automatic execution processing change module 124 determines whether or not, of the ticket attribute information acquired by the ticket attribute information acquisition (Step S303), the priority attribute 206 is a high priority such as "large (or high)" (Step S401). The automatic execution processing change module 124 determines that the priority is high when the value of the priority attribute 206 is a predetermined threshold value Thp or higher, and the process advances to Step S404.

Meanwhile, when the priority of the priority attribute 206 is not high, the automatic execution processing change module 124 determines, for the due date attribute 207 of the ticket attribute information, whether or not the number of days until the due date is within a predetermined threshold value Thd (Step S402). The threshold value Thd is a predetermined setting value.

In Step S402, the automatic execution processing change module 124 determines that there is still time until the due date when the number of days until the due date attribute 207 exceeds the threshold value Thd, and the process advances to Step S403. In Step S403, the automatic execution processing change module 124 determines whether or not a flag is set for the critical path attribute 210.

When a flag is not set, the automatic execution processing change module 124 determines that the ticket is not a critical path ticket, determines that ultimately the ticket does not require a change in the order of the queue, and ends the series of processing steps.

In Step S401, when the priority attribute 206 is a high priority of the threshold value Thp or higher, or in Step S402, when the number of days remaining until the due date is within the threshold value Thd, that is, when it is determined that there is no time until the due date, or in Step S403, when it is determined that the ticket is a critical path ticket, the automatic execution processing change module 124 determines that the order of the execution target information in the automatic execution queue 127 is required to be changed, and the process advances to Step S404.

The automatic execution processing change module 124 sets a first sort key in descending order of "priority" (Step S404), sets a second sort key in descending order of the shortest number of days remaining until the "due date" (Step S405), and sets a third sort key based on whether the ticket is a "critical path" (Step S406). The automatic execution processing change module 124 then sorts pieces of execution target information in the automatic execution queue 127 based on the first to third sort keys, changes the order of the execution target information in the execution queue 127 (Step S407), and ends the series of processing steps.

More specifically, the automatic execution processing change module 124 determines whether to change the execution order of the execution target information in accordance with the attribute information on the ticket corresponding to the source code of the commit completion notification, and when it is determined that the execution order is to be changed, sorts pieces of execution target information in a predetermined order in accordance with the ticket attribute information. In the first embodiment described above, there is described an example of changing the execution order of the execution target information based on the priority, the due date, and whether or not the ticket is a critical path ticket, but this invention is not limited to this, and it is sufficient as long as at least one element for sorting pieces of execution target information is selected from the ticket attribute information.

Next, the detailed procedure of the automatic execution setting (Step S305) in the flowchart illustrated in FIG. 3 is described with reference to the flowchart of FIG. 5.

The automatic execution setting is executed in the automatic execution processing change module 124. The automatic execution processing change module 124 determines whether or not there is a commit to the parent ticket by using, of the ticket attribute information acquired by the ticket attribute information acquisition (Step S303), the parent ticket attribute 208 (Step S501).

When there is not a commit to the parent ticket, the automatic execution processing change module 124 extracts the person in charge of the ticket from the person-in-attribute charge attribute 204. Next, the automatic execution processing change module 124 extracts the ticket corresponding to the person-in-charge attribute 204 from the ticket management server 110, and acquires information on the number of incomplete tickets of the person in charge and the number of defect tickets in the past of the person in charge. Further, the automatic execution processing change module 124 acquires information on the number of commits of the person in charge from the version management server 100 and determines whether or not any of those numerical values is larger than a threshold value Thc determined in advance, or acquires change information on the person in charge from the history attribute 211 and determines whether or not a difference between a change date and time of the person in charge and the current date and time is smaller than the threshold value Thc determined in advance (Step S502).

When the above-mentioned number of tickets or number of commits is smaller than the threshold value Thc, and the person in charge has not just recently changed, the automatic execution processing change module 124 determines from the information on the status attribute 205 whether the status is "work in progress" or "work complete" (Step S503).

When the status is "work in progress," the automatic execution processing change module 124 sets such that the content of the automatic execution processing is performed efficiently (Step S504), and ends the series of processing steps. Examples of setting such that the automatic execution processing is performed efficiently include limiting the source code to be built or tested to committed files, not requiring review implementation, not checking whether or not correction content of a lateral expansion of a problem of the same case is included, and not sending an e-mail notifying the development manager of the automatic execution result.

When it is determined in Step S501 that there is a commit to the parent ticket, it can be determined that the commit is important in terms of the work process of integrating (merging) the content of the child ticket into the parent ticket, and therefore the automatic execution processing change module 124 sets such that the content of the automatic execution processing is performed in a prioritized manner (Step S505), and ends the series of processing steps.

Similarly, in Step S502, when the number of tickets or the number of commits is larger than the threshold value Thc, or when the person in charge has just recently changed, the automatic execution processing change module 124 determines that the test or the like is required in a prioritized manner, sets such that automatic execution processing is performed in a prioritized manner (Step S505), and ends the series of processing steps.

In Step S503, when the status is "work complete," the automatic execution processing change module 124 sets such that automatic execution processing is performed in a prioritized manner (Step S505), and ends the series of processing steps.

Examples of setting such that automatic execution processing is performed in a prioritized manner include building or testing all of the source code of a target product, requiring review implementation, checking whether or not correction content of a lateral expansion of a problem of the same case is included, and sending an e-mail notifying the development manager of the automatic execution result.

With the processing illustrated in FIG. 4 and FIG. 5, the automatic execution processing change module 124 can efficiently implement automatic execution processing as required by automatically changing the automatic execution processing depending on the attributes of the ticket corresponding to the commit completion notification.

In the example described above, the automatic execution processing change module 124 determines the content of the automatic execution processing based on the parent ticket attribute 208, the person-in-charge attribute 204, and the history attribute 211, but this invention is not limited to this. The automatic execution processing change module 124 may determine the content of the automatic execution processing based on at least one of the attributes of the ticket attribute information.

Next, one embodiment of this invention is illustrated with reference to FIG. 6. In the first embodiment, there is described an example in which a plurality of persons in charge correct a source code for one ticket. FIG. 6 is a diagram for illustrating such a use case.

In the use case illustrated in FIG. 6, for a ticket 601 in which the type attribute 201 is "defect," two persons, that is, a person in charge A and a person in charge B, correct the defect by using the development client 300. Further, the person in charge A has a small number of incomplete tickets for the tickets that he or she has been in charge of, a small number of defect tickets that he or she has been in charge of in the past, and a small number of commits. The person in charge B as well, similarly to the person in charge A, has a small number of incomplete tickets for the tickets that he or she has been in charge of, a small number of defect tickets that he or she has been in charge of in the past, and a small number of commits.

The ticket 601 of the defect is input to the ticket management server 110 by a person who discovered the defect. The person in charge A is initially assigned as a person to deal with the defect. The person in charge A investigates the cause based on the content described in the ticket 601, and corrects the defect by using the development client 300.

At that time, the status attribute of the ticket 601 is switched to "work in progress" (or "correction in progress") by the ticket management server 110. In FIG. 6, only the type attribute 201, the person-in-charge attribute 204, and the status attribute 205 are illustrated as the attributes of the ticket 601, but the other attributes illustrated in in FIG. 2 are also included.

In the use case illustrated in FIG. 6, the correction portion of the defect extends across a wide range, and correction is performed a plurality of times even for the range that the person in charge A is in charge of. Therefore, the commit of the corrected source code is also divided into a plurality of times (602 to 604).

The person in charge A performs the first correction by using the development client 300, and commits the corrected source code to the version management server 100 (commit 602). The automatic execution processing server 120 performs the processing illustrated in FIG. 3 to FIG. 5 when the commit 602 has been committed (commit completion notification has been received; hereinafter the same). In the following, description is given of only a portion of the processing relating to the use case illustrated in FIG. 6.

In the processing triggered by the commit of the commit 602, the commit is not a commit to the parent commit in the processing of FIG. 5, which is the automatic execution setting (Step S305), and therefore the determination of Step S501 is "NO."

In the step of determining the person in charge and the history information of Step S502, in this use case, the number of incomplete tickets that the person in charge A is in charge of is small, and the number of defect tickets and the number of commits that the person in charge A has been in charge of in the past is small, and any of those numerical values is equal to or smaller than the threshold value Thc, and therefore the determination is "NO."

Next, the status attribute 205 is "work in progress" based on the determination of Step S503, and therefore the process advances to Step S504. Then, the automatic execution processing server 120 sets an efficient execution setting. As a result of the subsequent processing, for the commit 602, the automatic execution processing is executed based on an efficient setting.

In Step S309 of FIG. 3, an e-mail notification to the development manager is not sent. Next, in FIG. 6, the person in charge A performs the following correction by using the development client 300, and commits the corrected source code to the version management server 100 (commit 603). When the commit 603 has been committed, the automatic execution processing server 120 performs the processing illustrated in FIG. 3 to FIG. 5. This processing is the same as the processing for the commit 602.

Next, the person in charge A uses the development client 300 to perform the last correction on the portion that he or she is in charge of, and commits the corrected source code to the version management server 100 (commit 604).

When the commit 604 has been committed, the automatic execution processing server 120 performs the processing illustrated in FIG. 3 to FIG. 5, and the flow is similar to that of the commit 602. The person in charge A has now performed the last correction to be performed by him or her, and therefore sets the person in charge of the ticket 601 to the person in charge B from the development client 300 (ticket 601a).

The person in charge B investigates the cause based on the content described in the ticket 601a, and corrects the defect by using the development client 300. In the use case illustrated in FIG. 6, the correction portion of the defect extends across a wide range, and correction is performed a plurality of times even for the range that the person in charge B is in charge of.

Therefore, similarly to the person in charge A, the commit of the corrected source code is divided into a plurality of times. The person in charge B performs the first correction, and commits the source code corrected by using the development client 300 to the version management server 100 (commit 605).

The automatic execution processing server 120 performs the processing illustrated in FIG. 3 to FIG. 5 when the commit 605 has been committed. In the following, description is given of only a portion of the processing relating to the use case illustrated in FIG. 6.

In the processing triggered by the commit of the commit 605, the commit is not a commit to the parent commit in the processing of FIG. 5, which is the automatic execution setting (Step S305), and therefore the determination of Step S501 is "NO."

In the step of determining the person in charge and the history information of Step S502, in this use case, the number of incomplete tickets that the person in charge B is in charge of is small, and the number of defect tickets and the number of commits that the person in charge B has been in charge of in the past is small, and any of those numerical values is equal to or smaller than within the threshold value Thc, and therefore the determination by the automatic execution processing server 120 is "NO."

The status attribute is "work in progress" based on the determination of Step S503, and therefore the process advances to Step S504. Then, the automatic execution processing server 120 sets an efficient execution setting. As a result of the subsequent processing, for the commit 602, the automatic execution processing is executed based on an efficient setting. In Step S309 of FIG. 3, an e-mail notification to the development manager is not sent.

Next, the person in charge B performs the subsequent correction, and commits the source code corrected by using the development client 300 to the version management server 100 (commit 606). When the commit 606 has been committed, the automatic execution processing server 120 performs the processing illustrated in FIG. 3 to FIG. 5. This flow is the same as the flow for the commit 605.

Next, the person in charge B performs the last correction by using the development client 300. In this case, before performing the commit, the person in charge B changes the status of the ticket to "work complete" by using the development client 300 (ticket 601b).

The person in charge B commits, for the ticket 601b, the corrected source code to the version management server 100 by using the development client 300 (commit 607). The automatic execution processing server 120 performs the processing illustrated in FIG. 3 to FIG. 5 when the commit 607 has been committed. In the following, description is given of only a portion of the processing relating to the use case illustrated in FIG. 6.

In the processing triggered by the commit of the commit 605, the commit is not a commit to the parent commit in the processing of FIG. 5, which is the automatic execution setting (Step S305), and therefore the automatic execution processing server 120 determines "NO" in Step S501. In the step of determining the person in charge and the history information of Step S502, in this use case, the number of incomplete tickets that the person in charge B is in charge of is small, and the number of defect tickets and the number of commits that the person in charge B has been in charge of in the past is small, and any of those numerical values is equal to or smaller than the threshold value Thc, and therefore the determination by the automatic execution processing server 120 is "NO."

The status attribute is "work complete" based on the determination of Step S503, and therefore the process advances to Step S505. Then, the automatic execution processing server 120 sets such that the automatic execution is performed in a prioritized manner. As a result of the subsequent processing, for the commit 607, the automatic execution processing is executed based on a prioritized setting. In Step S309 of FIG. 3, a notification such as e-mail to the development manager is sent.

This means that, for a commit on which work is in progress, efficient automatic execution is performed based on the attribute information on the ticket, and for a commit on which work is complete, prioritized automatic execution is performed as the final work. As a result, efficient automatic execution processing can be performed as a whole.

As a result of the above, in the automatic execution processing server 120, the content of the automatic execution processing can be automatically changed based on the attributes of the ticket, and automatic execution processing in continuous integration can be efficiently performed.

In the first embodiment described above, a configuration in which the version management server 100 and the ticket management server 110 are independent is described, but this invention is not limited to this, and the version management server 100 and the ticket management server 110 may be configured in one computer.

Second Embodiment

A second embodiment of this invention is one embodiment in which, in the program development assistance system and program development assistance method described in the first embodiment, a source code is created by a plurality of persons in charge by dividing one function into a plurality of sub-functions.

Figure 7:
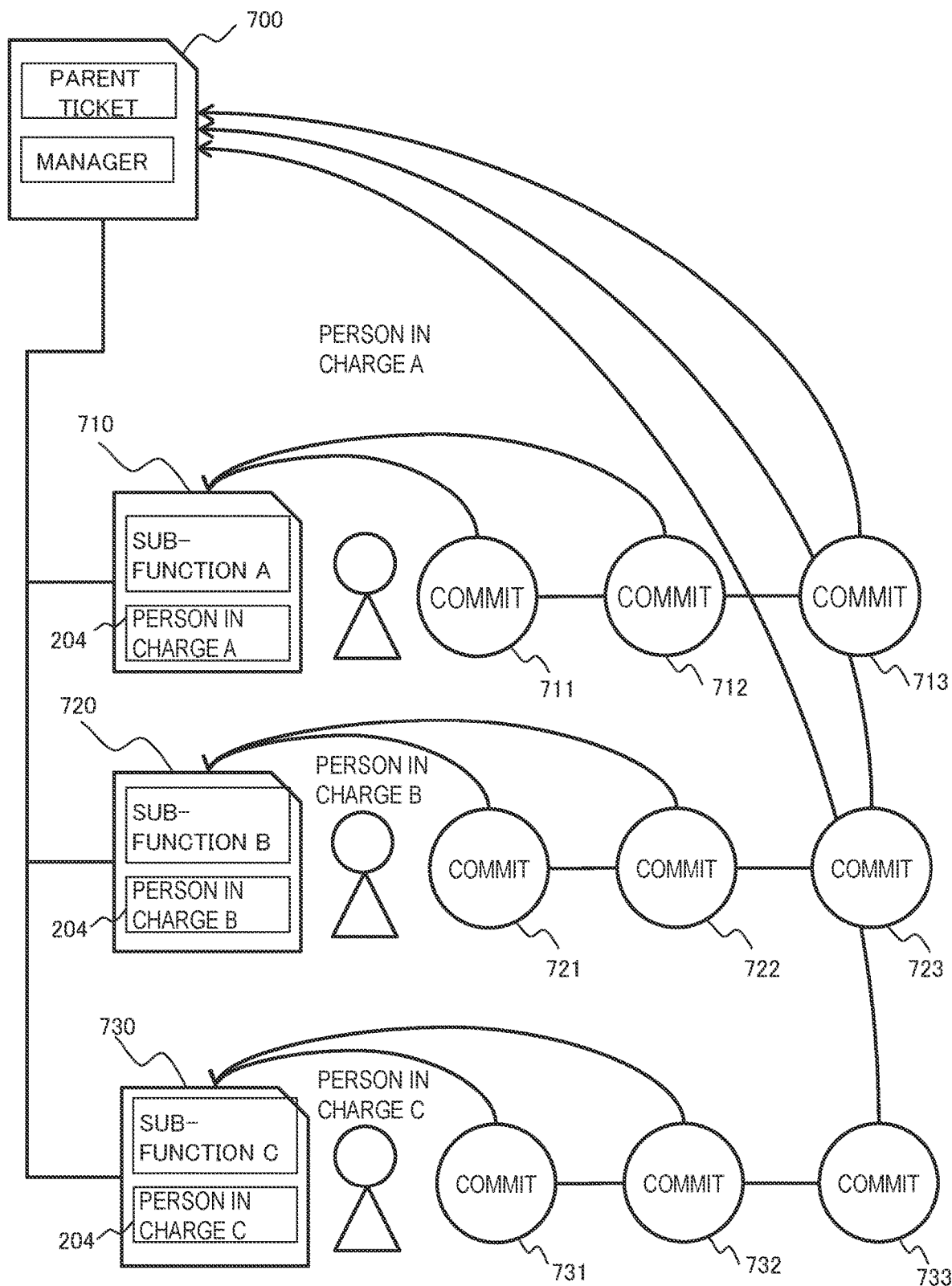
FIG. 7 is a diagram for illustrating an example of the use case of a second embodiment of this invention.

The block diagrams, descriptions of the tickets, and flowcharts described in the first embodiment are the same as those illustrated in FIG. 1 and FIG. 2 to FIG. 5, and therefore description of each of those is omitted here. There is now given description of a use case in the second embodiment with reference to FIG. 7. FIG. 7 is a diagram for illustrating an example of the use case of the second embodiment.

In the use case illustrated in FIG. 7, a parent ticket 700 represents one function, and a plurality of child tickets 710, 720, and 730 of the parent ticket 700 are tickets for creating a sub-function A, a sub-function B, and a sub-function C, respectively. A person in charge A, a person in charge B, and a person in charge C are assigned to the child ticket 710, the child ticket 720, and the child ticket 730, respectively.

Whether a ticket is the parent ticket is 700 or one of the child tickets 710, 720, and 730 is determined based on the parent ticket attribute 208. Further, in the second embodiment, it is assumed that all of the child tickets remain as "work in progress" until the status of the parent ticket becomes "work complete."

Similarly to in the first embodiment, the person in charge A, the person in charge B, and the person in charge C are each a person in charge having a small number of incomplete tickets for the tickets that he or she has been in charge of, a small number of defect tickets that he or she has been in charge of in the past, and a small number of commits.

The parent ticket 700, the child ticket 710, the child ticket 720, and the child ticket 730 are each input to the ticket management server 110. At that time, the person in charge A is set in the person-in-charge attribute 204 of the child ticket 710, the person in charge B is set in the person-in-charge attribute 204 of the child ticket 720, and the person in charge C is set in the person-in-charge attribute 204 of the child ticket 730.

The person in charge A creates a program of the sub-function A based on the content described in the ticket 710. In the use case illustrated in FIG. 7, the creation of the sub-function extends across a wide range, and program creation is performed a plurality of times even for the range that the person in charge A is in charge of.

Therefore, the commit of the created source code is also divided into a plurality of times. The person in charge A creates the first source code by using the development client 300, and commits the created source code to the version management server 100 (commit 711).

The automatic execution processing server 120 performs the processing illustrated in FIG. 3 to FIG. 5 when the commit 711 has been committed. In the following, description is given of only a portion of the processing relating to the use case illustrated in FIG. 7.

In the processing triggered by the commit of the commit 711, the commit is not a commit to the parent commit in the processing of FIG. 5, which is the automatic execution setting (Step S305), and therefore the automatic execution processing server 120 determines "NO" in Step S501.

In the step of determining the person in charge and the history information of Step S502, in this use case, the number of incomplete tickets that the person in charge A is in charge of is small, and the number of defect tickets and the number of commits that the person in charge A has been in charge of in the past is small, and any of those numerical values is equal to or smaller than the threshold value Thc, and therefore the determination by the automatic execution processing server 120 is "NO."

The status attribute is "work in progress" based on the determination of Step S503, and therefore the process advances to Step S504. Then, the automatic execution processing server 120 sets an efficient execution setting. As a result of the subsequent processing, for the commit 711, the automatic execution processing is executed based on an efficient setting. In Step S309 of FIG. 3, an e-mail notification to the development manager is not sent.

Next, the person in charge A creates the next function, and commits the source code created by using the development client 300 to the version management server 100 (commit 712). When the commit 712 has been committed, the automatic execution processing server 120 performs the processing illustrated in FIG. 3 to FIG. 5. This processing is the same as the processing for the commit 711. In the second embodiment, it is assumed that the creation of the sub-function A is completed by the commit 712.

Next, the sub-function A has been created by the person in charge A, and hence, for the parent ticket 700, all of the created source code is committed to the version management server 100 by using the development client 300 (commit 713).

The automatic execution processing server 120 performs the processing illustrated in FIG. 3 to FIG. 5 when the commit 713 has been committed. In the following, description is given of only a portion of the processing relating to the use case illustrated in FIG. 7.

In the processing triggered by the commit of the commit 713, the commit is a commit to the parent commit in the processing of FIG. 5, which is the automatic execution setting (Step S305). Therefore, the automatic execution processing server 120 determines "YES" in Step S501, and the process advances to Step S505. Then, the automatic execution processing server 120 sets a prioritized execution setting. As a result of the subsequent processing, for the commit 713, the automatic execution processing is executed based on a prioritized setting. In Step S309 of FIG. 3, an e-mail notification is sent to the development manager.

The person in charge B creates a program of the sub-function B based on the content described in the ticket 720. In the use case illustrated in FIG. 7, the creation of the sub-function extends across a wide range, and program creation is performed a plurality of times even for the range that the person in charge B is in charge of. Therefore, the commit of the created source code is also divided into a plurality of times.

The person in charge B creates the first source code, and commits the source code created by using the development client 300 to the version management server 100 (commit 721). The automatic execution processing server 120 performs the processing illustrated in FIG. 3 to FIG. 5 when the commit 721 has been committed. In the following, description is given of only a portion of the processing relating to the use case illustrated in FIG. 7.

In the processing triggered by the commit of the commit 721, the commit is not a commit to the parent commit in the processing of FIG. 5, which is the automatic execution setting (Step S305), and therefore the automatic execution processing server 120 determines "NO" in Step S501. In the step of determining the person in charge and the history information of Step S502, in this use case, the number of incomplete tickets that the person in charge B is in charge of is small, and the number of defect tickets and the number of commits that the person in charge B has been in charge of in the past is small, and any of those numerical values is equal to or smaller than within the threshold value Thc, and therefore the determination by the automatic execution processing server 120 is "NO."

The status attribute is "work in progress" based on the determination of Step S503, and therefore the process advances to Step S504. Then, the automatic execution processing server 120 sets an efficient execution setting. As a result of the subsequent processing, for the commit 721, the automatic execution processing is executed based on an efficient setting. In Step S309 of FIG. 3, an e-mail notification to the development manager is not sent.

Next, the person in charge B creates the next function and commits the source code created by using the development client 300 to the version management server 100 (commit 722). When the commit 722 has been committed, the automatic execution processing server 120 performs the processing illustrated in FIG. 3 to FIG. 5. This processing is the same as the processing for the commit 711. In the second embodiment, it is assumed that the creation of the sub-function B is completed by the commit 722.

Next, the sub-function B has been created by the person in charge B, and hence, for the parent ticket 700, all of the created source code is committed to the version management server 100 by using the development client 300 (commit 723).

The automatic execution processing server 120 performs the processing illustrated in FIG. 3 to FIG. 5 when the commit 723 has been committed. In the following, description is given of only a portion of the processing relating to the use case illustrated in FIG. 7.

In the processing triggered by the commit of the commit 723, the commit is a commit to the parent commit in the processing of FIG. 5, which is the automatic execution setting (Step S305). Therefore, the automatic execution processing server 120 determines "YES" in Step S501, and the process advances to Step S505. Then, the automatic execution processing server 120 sets a prioritized execution setting. As a result of the subsequent processing, for the commit 723, the automatic execution processing is executed based on a prioritized setting. In Step S309 of FIG. 3, an e-mail notification is sent to the development manager.

The person in charge C creates a program of the sub-function C based on the content described in the ticket 730. In the use case illustrated in FIG. 7, the creation of the sub-function extends across a wide range, and program creation is performed a plurality of times even for the range that the person in charge C is in charge of. Therefore, the commit of the created source code is also divided into a plurality of times.

The person in charge C creates the first source code, and commits the source code created by using the development client 300 to the version management server 100 (commit 731). The automatic execution processing server 120 performs the processing illustrated in FIG. 3 to FIG. 5 when the commit 731 has been committed. In the following, description is given of only a portion of the processing relating to the use case illustrated in FIG. 7.

In the processing triggered by the commit of the commit 731, the commit is not a commit to the parent commit in the processing of FIG. 5, which is the automatic execution setting (Step S305), and therefore the automatic execution processing server 120 determines "NO" in Step S501.

In the step of determining the person in charge and the history information of Step S502, in this use case, the number of incomplete tickets that the person in charge B is in charge of is small, and the number of defect tickets and the number of commits that the person in charge B has been in charge of in the past is small, and any of those numerical values is equal to or smaller than within the threshold value Thc, and therefore the determination by the automatic execution processing server 120 is "NO."

The status attribute is "work in progress" based on the determination of Step S503, and therefore the process advances to Step S504. Then, the automatic execution processing server 120 sets an efficient execution setting. As a result of the subsequent processing, for the commit 731, the automatic execution processing is executed based on an efficient setting. In Step S309 of FIG. 3, an e-mail notification to the development manager is not sent.

Next, the person in charge C creates the next function and commits the source code created by using the development client 300 to the version management server 100 (commit 732). When the commit 732 has been committed, the automatic execution processing server 120 performs the processing illustrated in FIG. 3 to FIG. 5. This processing is the same as the processing for the commit 731. In the second embodiment, it is assumed that the creation of the sub-function C is completed by the commit 732.

Next, the sub-function C has been created by the person in charge C, and hence, for the parent ticket 700, all of the created source code is committed to the version management server 100 by using the development client 300 (commit 733). The automatic execution processing server 120 performs the processing illustrated in FIG. 3 to FIG. 5 when the commit 733 has been committed. In the following, description is given of only a portion of the processing relating to the use case illustrated in FIG. 7.

In the processing triggered by the commit of the commit 733, the commit is a commit to the parent commit in the processing of FIG. 5, which is the automatic execution setting (Step S305). Therefore, the automatic execution processing server 120 determines "YES" in Step S501, and the process advances to Step S505. Then, the automatic execution processing server 120 sets a prioritized execution setting. As a result of the subsequent processing, for the commit 723, the automatic execution processing is executed based on a prioritized setting. In Step S309 of FIG. 3, an e-mail notification is sent to the development manager.

As a result, for a commit of sub-function creation, efficient automatic execution is performed based on the attribute information on the ticket, and for a commit to the parent ticket integrating the sub-functions, prioritized automatic execution is performed as the final work. As a result, efficient automatic execution processing can be performed as a whole.

For the use case illustrated in FIG. 7, in place of changing the automatic execution processing based on tickets attributes like in the second embodiment, it is also possible to use a branch function of the version management server 100 to change the automatic execution processing for each branch by providing work-in-progress branches and work-complete branches. However, this requires a number of branches equal to the number of persons in charge, and in large-scale program development, there are many persons in charge, which means that a large number of branches are required and branch management becomes difficult. Meanwhile, when ticket attributes are used like in the second embodiment, a single branch can be used, and therefore branch management becomes easier.

As a result of the above, in the automatic execution processing server 120, the content of the automatic execution processing can be automatically changed based on the attributes of the ticket, and automatic execution processing in continuous integration can be efficiently performed.

CONCLUSION

As described above, the program development assistance system of the embodiments described above can be configured as follows.

(1) There is provided a program development assistance system including an automatic execution processing server (120) including a processor (11), a memory (12), and a communication interface (13), the automatic execution processing server (120) including: a commit information acquisition module (121) configured to acquire, when a commit completion notification indicating that a source code has been registered is received, commit information including information on the source code and information on a ticket corresponding to the source code; a link module (122) configured to extract a ticket identifier corresponding to the commit completion notification from the commit information; an attribute information acquisition module (123) configured to acquire attribute information on the ticket based on the extracted ticket identifier; an automatic execution queue (127) configured to store, in a predetermined order, execution target information corresponding to the source code on which automatic execution processing is to be performed; an automatic execution processing change module (124) configured to generate information specifying a source code from the acquired commit information as execution target information, input the generated information to the automatic execution queue (127), and to change the predetermined order of the execution target information in the automatic execution queue (127) based on the acquired attribute information on the ticket; a target deliverable acquisition module (125) configured to acquire the source code and a test case on which the automatic execution processing is to be performed; an automatic execution processing module (126) configured to perform automatic execution processing by using the source code and the test case acquired by the target deliverable acquisition module (125) based on the predetermined order of the execution target information changed by the automatic execution processing change module (124); and a notification module (128) configured to notify a result of the automatic execution processing executed by the automatic execution processing module (126).

With the configuration described above, the automatic execution processing server 120 can automatically change the content of the automatic execution processing based on the attribute information on the ticket, and the automatic execution processing in continuous integration can be efficiently performed.

(2) The program development assistance system according to the above-mentioned item (1) further includes: a version management server (100) configured to manage one of the source code or a test case corresponding to the source code on a version-by-version basis; a ticket management server (110) configured to manage one of work relating to program development or content relating to a defect as a ticket; and a network (80) configured to couple the automatic execution processing server (120), the version management server to one another (100), and the ticket management server (110), the commit information acquisition module (121) is configured to receive a commit completion notification from the version management server (100), and to acquire the commit information corresponding to the commit completion notification from the version management server (100), and the attribute information acquisition module (123) is configured to acquire, from the ticket management server (110), the attribute information on the ticket which is based on the extracted ticket identifier.

With the configuration described above, by managing the version of the source code and the test case by the version management server 100, and managing work relating to program development or content relating to a defect as tickets by the ticket management server 110, processing can be distributed and performed in cooperation with the automatic execution processing server 120.

(3) In the program development assistance system according to the above-mentioned item (1), the attribute information acquisition module (123) is configured to: acquire at least one of a priority attribute (206), a due date attribute (207), or a critical path attribute (210) included in the attribute information on the ticket; and change the predetermined order of the execution target information in the automatic execution queue (127) based on the acquired attribute information.

With the configuration described above, the automatic execution processing server 120 can change the order of the execution target information in the automatic execution queue 127 based on at least one of the priority attribute 206, the due date attribute 207, or the critical path attribute 210.

(4) In the program development assistance system according to the above-mentioned item (1), the automatic execution processing module (126) is configured to: acquire attribute information on at least one of a parent ticket attribute (208), a person-in-charge attribute (204), a history attribute (211), or a status attribute (205) included in the attribute information on the ticket; and set content of the automatic execution processing based on the acquired attribute information.

With the configuration described above, the automatic execution processing server 120 can determine the content of the automatic execution processing based on the parent ticket attribute 208, the person-in-charge attribute 204, and the history attribute 211.

(5) In the program development assistance system according to the above-mentioned item (3), the automatic execution processing module (126) is configured to: acquire at least one numerical value of a number of incomplete tickets, a number of defect tickets in past, or a number of commits of a person-in-charge attribute (204) acquired by the attribute information acquisition module (123) by using the information on the person-in-charge attribute (204); and set content of the automatic execution processing based on the acquired numerical value.

With the configuration described above, in the automatic execution processing server 120, the content of the automatic execution processing can be automatically changed based on the attributes of the ticket, and the automatic execution processing in continuous integration can be efficiently performed.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

Supplement

Representative examples of the perspective of this invention other than those recited in the appended claims may include the following.

<11> The program development assistance system according to claim 3, wherein the program development assistance system is configured to:
  acquire time information from when a person in charge is changed by using information on a history attribute acquired by the attribute information execution module; and
  set the automatic execution processing based on the acquired time information.

<12> The program development assistance system according to claim 1, wherein the program development assistance system is configured to set, as content of the automatic execution processing set by the automatic execution change module, at least one of a source code to be built or to be tested, whether review implementation is required, whether correction confirmation of a defect of the same case is required, or whether notification to a development manager is required.

<13> The program development assistance method according to claim 8, further comprising:
  acquiring time information from when a person in charge is changed by using information on a history attribute acquired in the attribute information execution step; and
  setting the automatic execution processing based on the acquired time information.

<14> The program development assistance method according to claim 6, further comprising setting, as content of the automatic execution processing set in the automatic execution change step, at least one of a source code to be built or to be tested, whether review implementation is required, whether correction confirmation of a defect of the same case is required, or whether notification to a development manager is required.

What is claimed is:

1. A program development assistance system, comprising:
  an automatic execution processing server including a processor, a memory, and a communication interface,
  the memory storing instructions that when executed by the processor, configure the processor to:
  acquire, upon receiving a commit completion notification indicating that a source code has been registered, commit information including information on the source code and information on a ticket corresponding to the source code,
  extract a ticket identifier corresponding to the commit completion notification from the commit information,
  acquire attribute information on the ticket based on the extracted ticket identifier, the attribute information for each ticket including a priority value, a due date, and critical path flag,
  store, in a predetermined order, execution target information corresponding to the source code on which automatic execution processing is to be performed,
  generate information specifying a source code from the acquired commit information as execution target information,
  input the generated information to the automatic execution queue,
  change the predetermined order of the execution target information in the automatic execution queue based on the acquired attribute information on the ticket by determining whether the priority value is a predetermined value or greater, whether a number of days remaining until the due date is within a predetermined threshold and whether the critical path flag is true, and sorting the queue by setting a first sort key based on the priority value, setting a second sort key based on a number of days remaining until the due date, setting a third sort key based on whether the critical path key is set,
  acquire a source code and a test case on which the automatic execution processing is to be performed,
  perform automatic execution processing by using the source code and the test case acquired based on the predetermined order of the execution target information having been changed by the automatic execution processing change module, and
  notify a result of the automatic execution processing via email.

2. The program development assistance system according to claim 1, further comprising:
  a version management server configured to manage one of the source code or a test case corresponding to the source code on a version-by-version basis;
  a ticket management server configured to manage one of work relating to program development or content relating to a defect as a ticket; and
  a network configured to couple the automatic execution processing server, the version management server, and the ticket management server to one another,
  wherein the processor of the automatic execution processing server is configured to:
  receive a commit completion notification from the version management server,
  acquire the commit information corresponding to the commit completion notification from the version management server, and
  acquire, from the ticket management server, the attribute information on the ticket which is based on the extracted ticket identifier.

3. The program development assistance system according to claim 1,
  wherein the processor is configured to:
  acquire attribute information including at least one of a parent ticket attribute, a person-in-charge attribute, a history attribute, or a status attribute included in the attribute information on the ticket, and
  set content of the automatic execution processing based on the acquired attribute information.

4. The program development assistance system according to claim 1,
  wherein the processor is configured to:
  acquire at least one numerical value of a number of incomplete tickets, a number of defect tickets in past, or a number of commits of a person-in-charge attribute acquired by the attribute information acquisition module by using the information on the person-in-charge attribute, and set content of the automatic execution processing based on the acquired numerical value.

5. A program development assistance method for assisting development of a program by using an automatic execution processing server including a processor, a memory, and a communication interface, the program development assistance method comprising:

a commit information acquisition step of acquiring, by the automatic execution processing server, upon receiving commit completion notification indicating that a source code has been registered, commit information including information on the source code and information on a ticket corresponding to the source code;

a link step of extracting, by the automatic execution processing server, a ticket identifier corresponding to the commit completion notification from the commit information;

an attribute information acquisition step of acquiring, by the automatic execution processing server, attribute information on the ticket based on the extracted ticket identifier, the attribute information for each ticket including a priority value, a due date, and critical path flag;

a queuing step of storing, in a predetermined order, by the automatic execution processing server, execution target information corresponding to the source code on which automatic execution processing is to be performed in an automatic execution queue;

an automatic execution processing change step of generating, by the automatic execution processing server, information specifying a source code from the acquired commit information as execution target information, inputting the generated information to the automatic execution queue, and changing the predetermined order of the execution target information in the automatic execution queue based on the acquired attribute information on the ticket by determining whether the priority value is a predetermined value or greater, whether a number of days remaining until the due date is within a predetermined threshold and whether the critical path flag is true, and sorting the queue by setting a first sort key based on the priority value, setting a second sort key based on a number of days remaining until the due date, setting a third sort key based on whether the critical path key is set;

a target deliverable acquisition step of acquiring, by the automatic execution processing server, a source code and a test case on which the automatic execution processing is to be performed;

an automatic execution processing step of performing, by the automatic execution processing server, automatic execution processing by using the source code and the test case acquired in the target deliverable acquisition step based on the predetermined order of the execution target information changed in the automatic execution processing change step; and a notification step of notifying, by the automatic execution processing server, a result of the automatic execution processing executed in the automatic execution processing step.

6. The program development assistance method according to claim 5, wherein the commit information acquisition step comprises receiving, via a network, a commit completion notification from a version management server configured to manage one of the source code or a test case corresponding to the source code on a version-by-version basis, and acquiring the commit information corresponding to the commit completion notification from the version management server, and wherein the attribute information acquisition step comprises acquiring, via the network, the attribute information on the ticket which is based on the extracted ticket identifier from a ticket management server configured to manage one of work relating to program development or content relating to a defect as a ticket.

7. The program development assistance method according to claim 5, wherein the automatic execution processing step comprises:

acquiring attribute information on at least one of a parent ticket attribute, a person-in-charge attribute, a history attribute, or a status attribute included in the attribute information on the ticket; and setting content of the automatic execution processing based on the acquired attribute information.

8. The program development assistance method according to claim 5, wherein the automatic execution processing step comprises:

acquiring at least one numerical value of a number of incomplete tickets, a number of defect tickets in past, or a number of commits of a person-in-charge attribute acquired in the attribute information acquisition step by using the information on the person-in-charge attribute; and setting content of the automatic execution processing based on the acquired numerical value.

* * * * *